United States Patent
Báder et al.

(10) Patent No.: US 10,440,087 B2
(45) Date of Patent: Oct. 8, 2019

(54) ESTIMATION OF LOSSES IN A VIDEO STREAM

(71) Applicant: Telefonaktiebolaget LM Ericsson (publ), Stockholm (SE)

(72) Inventors: Attila Báder, Paty (HU); Ferenc Szász, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 21 days.

(21) Appl. No.: 15/555,573

(22) PCT Filed: Jul. 20, 2017

(86) PCT No.: PCT/EP2017/068364
§ 371 (c)(1),
(2) Date: Sep. 5, 2017

(87) PCT Pub. No.: WO2018/024497
PCT Pub. Date: Feb. 8, 2018

(65) Prior Publication Data
US 2018/0241797 A1 Aug. 23, 2018

Related U.S. Application Data

(60) Provisional application No. 62/369,448, filed on Aug. 1, 2016.

(51) Int. Cl.
*H04L 29/06* (2006.01)
*H04L 12/26* (2006.01)
*H04L 12/24* (2006.01)

(52) U.S. Cl.
CPC .......... *H04L 65/80* (2013.01); *H04L 43/0829* (2013.01); *H04L 43/12* (2013.01);
(Continued)

(58) Field of Classification Search
CPC ..................................................... H04L 65/80
(Continued)

(56) References Cited

U.S. PATENT DOCUMENTS

2010/0322319 A1 12/2010 Xie et al.
2012/0307915 A1* 12/2012 Clark .................. H04L 43/0829
375/240.27
(Continued)

FOREIGN PATENT DOCUMENTS

EP 2077672 A1 7/2009
EP 2493205 A1 8/2012

OTHER PUBLICATIONS

Mohamed, S., et al., "A Study of Real-Time Packet Video Quality Using Random Neural Networks," IEEE Transactions on Circuits and Systems for Video Technology, vol. 12, No. 12, Dec. 1, 2002, pp. 1071-1083.

*Primary Examiner* — David R Lazaro
*Assistant Examiner* — Zia Khurshid
(74) *Attorney, Agent, or Firm* — Coats & Bennett, PLLC

(57) ABSTRACT

A method for estimating a loss of information in a video stream comprising video frames of different frame types, wherein the video stream is transmitted in a sequence of data packets, the method comprising
during a first learning period of the video stream:
identifying the different frame types in the video stream, determining a reference average size of at least some of the frame types in the video stream, determining a reference occurrence frequency how often at least some of the frame types occur in the video stream, wherein the reference average size and the reference occurrence frequency are determined using information provided in a header of the transmitted data packets,
during a second time period of the stream:
(Continued)

identifying the different frame types in the video stream taking into account the reference average frame size, the reference occurrence frequency determined in the first learning period, and information provided in the header of the data packets in the second time period, determining the size of at least some of the frames in the second time period, determining the loss of information in the video stream taking into account the reference average size, the reference occurrence frequency determined in the first learning period and the determined size of at least some of the frames in the second time period.

40 Claims, 3 Drawing Sheets

(52) U.S. Cl.
CPC .......... *H04L 69/22* (2013.01); *H04L 41/5009* (2013.01); *H04L 43/026* (2013.01); *H04L 43/04* (2013.01)

(58) Field of Classification Search
USPC ........................................................ 709/219
See application file for complete search history.

(56) References Cited

U.S. PATENT DOCUMENTS

| | | |
|---|---|---|
| 2015/0003530 A1 | 1/2015 | Gao et al. |
| 2016/0021397 A1* | 1/2016 | Stepin .................... H04N 19/48 375/240.12 |

* cited by examiner

ESTIMATION OF LOSSES IN A VIDEO STREAM

TECHNICAL FIELD

The present application relates to a method for estimating a loss of information in a video stream comprising video frames of different frame types. Furthermore, the corresponding entity configured to carry out the method, a computer program and the carrier is provided.

BACKGROUND

IP Multimedia Subsystem (IMS) based services have been successfully deployed in 4G mobile networks. Voice over LTE (VoLTE) services are taking over the role of circuit switched 2G and 3G technologies. VoLTE enables higher quality services and more efficient transmission and radio spectrum utilization than previous 2G and 3G technologies.

Taking advantage of IMS, 4G mobile networks also enable other advanced services, like video telephony over LTE (ViLTE) and Rich Communications Services (RCS). Example of RCS are instant messages, audio and video messaging, file sharing or other services.

Circuit-switched technologies in 2G and 3G networks for voice services provide well defined and guaranteed quality of services for voice. The expectation of users is that newer technologies provide even better service quality. The success of new services also depends significantly on the user experience.

Network operators use customer experience management (CEM) systems to monitor quality of experience (QoE) of the subscribers. CEM system collects event and counter information from several parts of the network and calculate KPIs (Key Performance Indicators) from correlated data. These are classified by 3GPP as accessibility, retainability, mobility and integrity KPIs. One of the most important integrity KPIs is the mean opinion score (MOS) of multimedia services.

*ITU-T standardized a methodology estimating audio, video and audio-video MOS (ITU-T 1201.1).* It is very complex solution containing around 10-12 parameters, lot of side information that cannot be obtained directly from the network data sources. Originally, MOS reflects the perceived voice, video, or audio-video quality, in scale of 1-5, measured in laboratory human tests. MOS depends on many factors, starting from the codec type, rate of the multimedia flow, the signal processing of the multimedia devices, the bandwidth and any other impairment of the media that may occur during transmission: packet loss, delay, and jitter. There have been several attempts to estimate the MOS for different multimedia types and estimating the different impairment factors affecting MOS. ITU-T has standardized P800.1 the measuring method of assessing objective and subjective quality of voice in a telephone network. ITU-T 1201.1 and 2 specify an algorithm and model for monitoring and estimating audio, video and audio-video MOS.

This kind of information can be obtained only by installing software on the entity to which the data stream is transmitted, e.g. the mobile phone. The large number of parameters makes the formula uncertain and in a mobile communications network is not really possible to install the same software on each mobile phone.

This means that the implementation of the model it is not really feasible. Besides that, the model does not handle the quality degradation provoked by the propagation of frame errors and it takes into account only the loss of frame, but not the degree of frame loss.

Accordingly, the need exists to provide a method which facilitates the estimation of losses in a video stream.

SUMMARY

This need is met by the features of the independent claims. Further aspects are described in the dependent claims.

According to a first aspect a method for estimating a loss of information in a video stream is provided, the video stream comprising video frames of different frame types wherein the video stream is transmitted in a sequence of data packets. During a first learning period of the video stream the different frame types in the video stream are identified. Furthermore, a reference average size of at least some of the frame types in the video stream is determined together with a reference occurrence frequency how often at least some of the frame types are occurring in the video stream. The reference average size and the reference occurrence frequency are determined using information provided in a header of the transmitted data packets. In a second time period of the media stream the different frame types of the video stream are identified taking into account the reference average frame size, the reference occurrence frequency, both been determined in the first learning time period, and taking into account information provided in the header of the data packets in the second time period. Furthermore, the size of at least some of the frames in a second time period is determined. The loss of information in the video stream is determined taking into account the reference average size, the reference occurrence frequency determined in the first learning period and the determined size of at least some of the frames in the second time period.

With the presently claimed method it is possible to determine or estimate a loss of information only based on header information and on the size of some of the frames. Accordingly, a single entity in a user plane monitoring the transmitted video packets can be used to determine the loss of information. A dedicated software on the receiving entity which is receiving the media stream is not necessary and no other side information is needed.

In the learning period the following information provided in the header may be used to identify the different frame types:

A sequence number provided in the data packets, a marker indicating when a new video frame starts and a time indicator associated with the video frame. Accordingly, in the first learning period the sequence number may be helpful to detect the reference average size and to determine whether data packets were lost or delayed during the transmission. In the second time period the identification of the different frames may be based only on the marker indicating when a new video frame starts and on the time indicator associated with the video frame. The sequence number may not be used in the second time period as the computational effort to continuously determine the sequence number is quite high. However, the reference average size and the reference occurrence frequency is known so that it is possible to determine the size of some of the frames in the second time period.

The loss of information is a function of the lost bytes in the different frame types. The method, as will be explained below, takes into account if the loss occurred in an I or P frame. The effect of the loss on the subsequent dependent packets is then also determined. It is inter alia determined whether the loss in an I or P frame occurred close or far from a subsequent I frame Furthermore, the corresponding entity is provided, the entity comprising a memory and at least one processor, and the memory contains instructions executable by the at least one processor and the entity is operative to carry out the steps mentioned above and the further steps mentioned in more detail below. Furthermore, a computer program comprising program code to be executed by at least one processor of the entity is provided wherein execution of the program code causes the at least one processor to execute the above described method. Finally, a carrier comprising the computer program is provided.

It is to be understood that the features mentioned above and features yet to be explained below can be used not only in the respective combinations indicated, but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
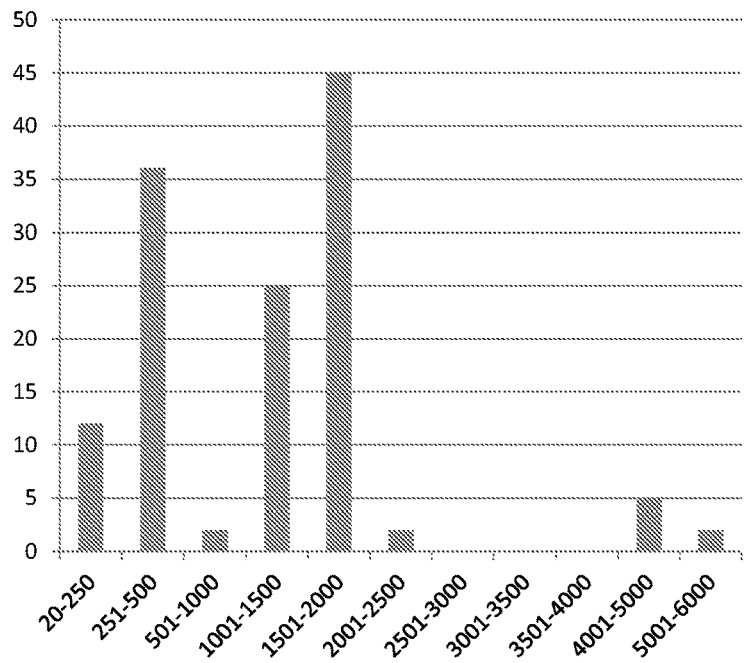
FIG. 1 shows a size distribution of frames used to determine the average size of the different frame types present in a video stream.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

The method proposed and discussed below can be used for estimating a loss of data packets or loss of information in a video stream and can be especially used for estimating the mean opinion score, MOS, of video services.

It is most useful in networks where the major impairment factor is the packet loss, e.g. in radio and mobile networks, and for video services where longer buffering or end-to-end packet or frame retransmission is not possible, e.g. video telephony, gaming or other real-time video services.

The invention proposes a MOS estimation model where the significant impairments of the transmission of the video session are taken into account by effective packet loss. The effective packet loss is determined by the RTP header information and packet size and takes into account frame structure of encoded compressed video, such as H.248 or MPEG4.

In a single tapping point in the network, e.g. at the interface of a Packet Gateway in a mobile network, the RTP packets are captured. It can be the gateway between a mobile packet core network of an operator and other packet data networks, such as the Internet, corporate intranets, and private data networks. Effective packet loss and MOS is determined with a time granularity of a time period such as few seconds, e.g. for 5 s time periods.

For each time period the video frame structure and characteristics is determined, such as:
Periods of I-frames
Average number of P and B-frames between I-frames
Based on the statistics of RTP packet payload size, the average
  P, I and B frame sizes
The average packet sizes per frame types (I, P and B frames) are
  also determined. (The frames usually consists of more packets)
Missing or delayed packets are identified. Based on the rules specified below the following parameters are identified:
Frame type the lost packets belongs to
Ratio of the frame lost
Propagation of the error
Effective packet loss ratio for the time slot
Based on the codec type and bitrate, the baseline MOS (without impairment) is determined. The impairment of the baseline MOS is determined by the effective packet loss.

A ViLTE (Video over LTE) MOS (Mean Opinion Score) calculation method is provided based on effective packet loss of different types of frame. As mentioned above the calculation method is based solely on data obtainable from parsing the header of the video data packets. The ViLTE call is segmented into time periods, such as 5 second long slices. However, a shorter or longer time period between 3 and 10 seconds may be used. The first time period, the first learning period, is used to determine the characteristics of the video stream (average I/P/B frame size and the frequency of different frame types). This information is then used to determine further parameters in a second time period in order to determine a loss of information such a packet loss or MOS in the second time period.

During the first learning period of the video stream the main characteristics of the stream are determined. These characteristics are needed for the correct identification of RTP packets that contain different frame types. The main characteristics are:
The average frame size of I, P and B frames
The frequency of different frame types This is the only information needed for the correct identification of frame types in the subsequent slices.

RTP packets with consecutive RTP sequence numbers and identical RTP timestamps are carrying one frame. One frame can be carried by one more RTP packet, based on the size of the given frame. The RTP packet that contains the last part of the frame is always marked (the Marker bit in the RTP header is set to 1).

In the first learning period the following information provided in the header is used to identify the different frame types: a sequence number of the data packets, a marker indicating when a new video frame starts, and a time indicator associated with the video frame.

The sequence number is specially used in the first learning time period to assure that a packet loss is low so that a reference average size determined for the different frame types corresponds to the actual frame size in the video stream and a reference occurrence frequency of the different frame types is correctly determined.

When this kind of information is correctly determined it is possible to limit the parsing of the header to the following information in the second time period: the marker indicating when a new video frame starts, and a time indicator associated with the video frame.

At the beginning of the video stream an I frame is sent. The last RTP packet that carries the first I frame is marked as it is the last packet of a frame. Packets between the marked packet and the first RTP packet of the stream are not marked, but the RTP timestamp is the same and the RTP sequence number is increasing by 1 for each consecutive RTP packet.

Between two consecutive I frames multiple P and/or B frames are sent. The average size of an I frame is considerably larger than the average size of a P frame. The average size of a P frame is larger than the average size of a B frame. An example of frame size distribution can be seen in FIG. 1 which sows the determined size of frames in the first learning period and how often the different frame sizes occur.

All the frames smaller than 1000 bytes are considered B frames, frame sizes between 1000 and 2500 bytes are considered P frames and frames larger than 2500 bytes are considered I frames. As the different frame types can be identified using the methods described in the previous paragraphs, the average I and P frame frequency can be calculated, in other words the reference occurrence frequency. Based on the characteristics of H.248 and MPEG4 video codecs, the frequency of P frames should be considerably higher than the frequency of I frames. Using statistical methods, the frequency of different frame types can be obtained. The average frame size of different frame types is also can be calculated for the first learning period.

During the first learning period, e.g. the first 5 to 10 seconds long video stream slice, the first learning period, multiple I, P and B frames are captured. If the RTP packet loss during the learning phase is high, higher than a defined threshold, e.g. (>1%), then the next, e.g. again 5 seconds slice will be the learning period. The packet loss can be determined taking into account the packet number of each packet After the learning period, during the determination of stream characteristics phase, the second time period, the average frame size and the frequency of different frame types can be calculated. The frame loss and the effective packet loss can be calculated solely based on the frequency, the average frame size and the actual frame size in the second time period. The frame loss detection based on RTP packets, the effective packet loss calculation and the Video MOS calculation is repeated for each 5 second long slice (second time period) of video stream. The effective packet loss also depends on the position of the frame in the video stream where the packet is lost. In the example mentioned above, a 5 s time period was used for the first and second time period. However, it should be understood that other values between, e.g. 3 and 10 s may be used.

Figure 2:
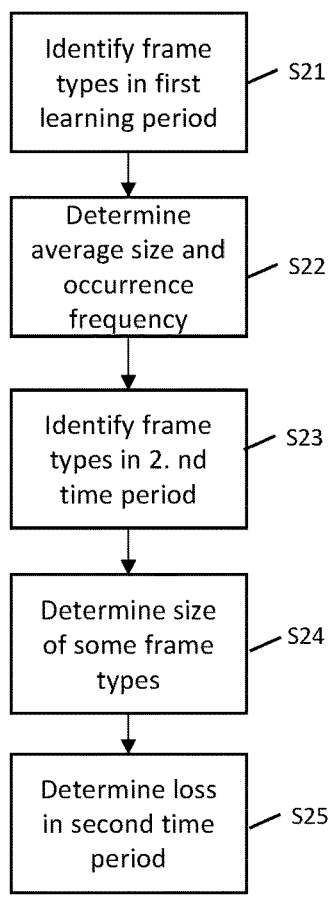
FIG. 2 shows the flowchart comprising steps carried out to determine a loss of information in a video stream.

FIG. 2 summarizes some of the steps needed to determine the loss of information. In a first step S 21 the different frame types are identified in the learning period as discussed above. To this and, in step S 22 the average size and the average current frequency is determined in the learning period as discussed above in connection with FIG. 1. In the following time period, the second time period, the different frame types of the video stream are determined (step S 23) taking into account the reference average size and the reference occurrence frequency of the different frames. With the knowledge of the different frame types in the second time period it is possible to determine the size of some of the frame types (step S 24) in the second time period. When the frame size in the second time period is the same as in the learning period, where it is known that the loss is low it might be deduced that the overall packet loss or loss of information is low. The higher the difference between the average size and the size determine the second time period is, the higher the packet loss will be. The method may be carried out with one learning period followed by several consecutive second time periods.

Figure 3:
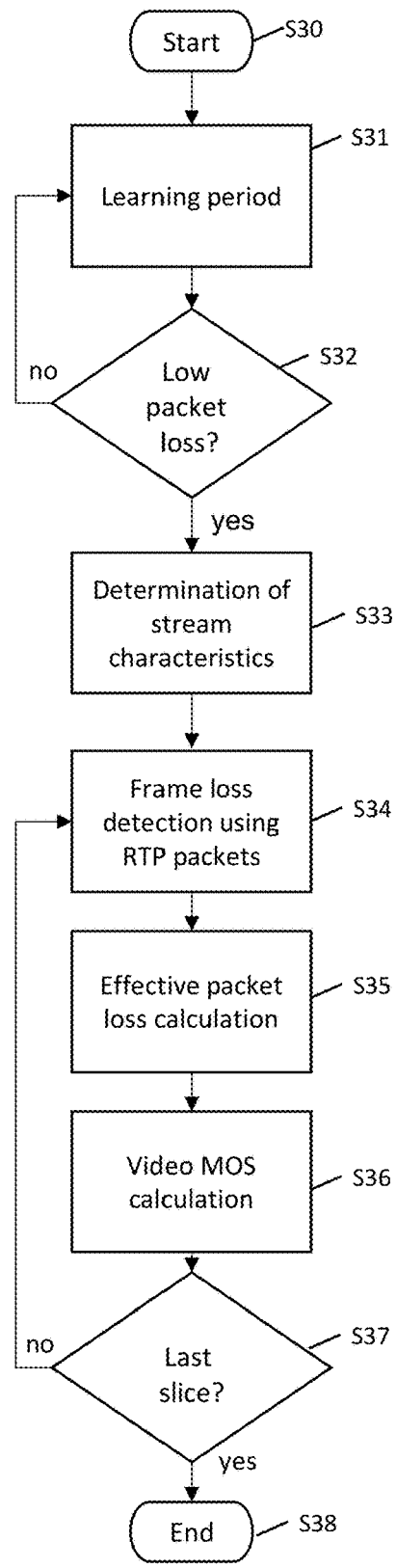
FIG. 3 shows a further flowchart comprising more detailed steps carried out to determine a loss of information in the video stream.

FIG. 3 shows a more detailed view of how a packet loss may be determined. The method starts in step S 30. In a second step S 31 the learning period is started and it is determined in step S 32 whether the packet loss is lower than a predefined threshold such as 1%. This can be determined taking into account the sequence numbers of the different data packets of the video stream. Only when the packet loss is below a threshold, the method continues with the determination of the stream characteristics in the data stream (step S33). This determination of the stream characteristic comprises, as mentioned above, the reference average size of the frames in the video stream and the reference occurrence frequency in the video stream. In step S 34 the frame lost detection in the second time period can be determined. Here, as will be explained below the different frame types are determined using the information in the header using the marker indicating when you just frame starts and the time indicator associated with each video frame, but not using the sequence number.

The effective packet loss ratio in a time slot is calculated in the following way:

The effective packet loss ratio in a time slot is calculated in the following way:

$$L_{eff} = \frac{1}{S_{all}} \sum_{k=1}^{M} \left[ S_I - R_{Ik} + \frac{S_I - R_{Ik}}{S_I} \right. \quad (1)$$

$$\left. \sum_{m=1}^{Nk} \left[ S_P - R_{Pm} + S_B - R_{Bm} + \sum_{q=m+1}^{Nk} \frac{S_P - R_{Pm}}{S_P} [R_{Pq} + R_{Bq}] \right] \right],$$

where $S_{all}$ is the size of all frames that that should have been received in the slice time period. If packets are lost in a frame, or a complete frame is lost, the average frame size is taken into account for this frame, M is the number of the I-frames that should be received during the time slot, $S_I$ is the average size of the I-frames in bytes, $R_{Ik}$ is the received bytes of the k-th I-frame, $N_k$ is the number of frames between k-th and the next I-frame, $S_B$ is the average size of the B-frames in bytes, $R_{Bm}$ is the received bytes of the m-th B-frame, $S_P$ is the average size of the P-frames in bytes, $R_{Pm}$ is the received bytes of the m-th P-frame, $R_{Pq}$ is the received bytes of the q-th P-frame, $R_{Bq}$ is the received bytes of the q-th B-frame.

The above formula takes into account the packet loss of I-, P- and B-frames. It also takes into account the error propagation of the packet loss of I-frames and P-frames. The formula also takes into account by the factor $N_k$ how far the loss occurred from the next I frame.

The 3. (last) sum takes into account the effect of packet loss of a P frame in the subsequent P and B frames. If a packet is lost in a P frame, it causes information loss in the subsequent P and B frames as well, even if packets are not lost in these frames, until an I frame corrects the packet loss.

In the same way, the 2. sum takes into account the effect of packet loss in an I frame in the subsequent P and B frames. More specifically, the terms in 2. and 3. sum that has these factors:

$$\frac{S_I - R_{Ik}}{S_I} \text{ and } \frac{S_P - R_{Pm}}{S_P}$$

take into account the propagation of error in different frame types.

In the formula mentioned above, I, P and B frames are taken into account. It is possible to remove the parts provided for the B frame, as their size is so small, that it is possible to consider only I- and P-frames. Delay and (implicitly) the jitter of packets are taken into account in the following way. Since the solution focuses on real-time video services, there is no time to buffer or wait for delayed packets for a longer time. Packets that are not received in e.g. Dmax=200 ms can be considered lost for the application. Therefore, those packets that arrive later in the trace than Dmax, a configurable parameter, are considered lost in this model.

The above formula does not distinguish which packet is lost or delayed within a frame. A more generalized, but in the same time more complex, formula can be provided to take into account the position of the lost packet or packets within the frame:

$$L_{eff} = \frac{1}{S_{all}} \sum_{i,qj,f}^{Nf,Nf,Mf,F} a_{iqjf}(S_{jf} - R_{ijf}), \qquad (2)$$

where $N_f$ is the number of frame in the time slot for frame type f, (I, P or B frame)

$M_r$ is the max. number of packets in frame type f,

F is the number of frame types $S_{jf}$ is the average packet size of j-th packet of frame type f $R_{jif}$ is the received packet size of frame I, j-th packet of frame type f $a_{iqjf}$ is the effect of a lost packet to the own and subsequent frames and may be a parameter that is determined in advance and stored in the entity that is carrying out the calculation.

Referring back to FIG. 3 in step S36, the MOS calculation may be carried out. The MOS estimation formula is split into two factors, or two terms. The first one takes into account the terminal capabilities, resolution and the used codec type and rate, namely the factors do not depend on the radio or other network degradation. The other one takes into account the MOS degradation due to the network, radio or transport related packet loss, delay, and their effects on the frame structure of the video:

$$MOS = MOS_{max}(\text{codec type,bitrate,resulution}, \ldots)*F(L_{eff}) \qquad (3)$$

or, $$MOS = MOS_0 - I(\text{codec type,bitrate,resolution}, \ldots) - I(L_{eff}) \qquad (4)$$

The other information than $L_{eff}$ is usually obtained from different network probes, such as GTP-C (GPRS Tunneling Protocol-Control) (bitrate, IMEI (International Mobile Equipment Identity)), GTP-U (-user) (bitrate) or other customer/equipment reference data (IMEI—resolution mapping info), etc. Steps S34 to S37 can be carried out for the different second time periods of the video stream. Accordingly, it is checked in step S37 whether the whole video stream is processes. If not steps S34 to S36 are repeated until the whole video stream was processed. The method ends in step S38.

In the example above the calculation considered I frames, P frames, and B frames. In the following an example will be discussed where the video comprises only I frames and P frames and does not contain B frames. Video streaming over LTE (Long Term Evolution) is a streaming technology which only uses I frames and P frames.

The effective packet loss ratio in a time slot is calculated in the following way:

$$L_{eff} = \frac{1}{S_{all}} \sum_{k=1}^{M} \left[ S_I - R_{Ik} + \frac{S_I - R_{Ik}}{S_I} \sum_{m=1}^{Nk} R_{Pm} + \frac{R_{Ik}}{S_I}[S_P - R_{Pfirst}] + \frac{S_P - R_{Pfirst}}{S_P} \sum_{q=first}^{Np} R_{Pq} \right], \qquad (5)$$

where $S_{all}$ is the size of all frames that that should have been received in the slice time period. If packets are lost in a frame, or a complete frame is lost, the average frame size is taken into account for this frame, M is the number of the I-frames that should be received during the time slot, $S_I$ is the average size of the I-frames in bytes, $R_{Ik}$ is the received bytes of the k-th I-frame, $N_k$ is the number of P frames between k-th and the next I-frame, $R_{Pm}$, is the received bytes of the m-th P-frame, $S_P$ is the average size of the P-frames in bytes, $R_{Pfirst}$ is the received bytes of the first P-frame between the k-th and next I-frame that contains a loss $N_p$ is the number of P-frames between the first P-frame with loss and the next I-frame $R_{Pq}$ is received bytes of the q-th P-frame.

By way of example, a video stream may contain 30 P frames between two I frames. Supposed that the first two P frames do not have a loss, but only the third P frame has a loss, the parameter q mentioned in formula (5) will then run between 3 and 30.

This calculation takes into account that one P frame with loss influences the next P frame, wherein the loss is limited to the P frames before the next I frame and does not propagate to a P frame located after a next I frame.

In the following one implementation of the calculation is mentioned:

```
MOS_MAX = 4.1;
SENSITIVITY = 1.0;
MOS_MIN = 1.0;
mos = MOS_MAX;
if (effectivePacketLoss > 0.01) {
mos = MOS_MAX - SENSITIVITY * log(effectivePacketLoss * 100.0);
if (mos < MOS_MIN) {
        mos = MOS_MIN;
    }
  }
}
```

Figure 4:
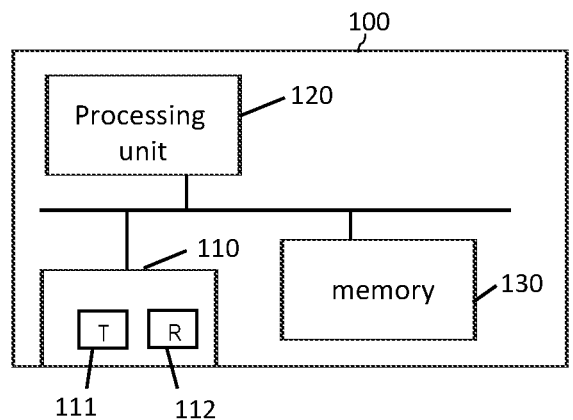
FIG. 4 shows a schematic view of an entity configured to determine the mean opinion score, MOS, of a multimedia service such as a video stream.

FIG. 4 shows a schematic architectural view of an entity 100 which can carry out the above discussed calculation of loss. The entity may be incorporated into any node present in the data packet stream, e.g. in a gateway. The entity 100 comprises an interface 110 which is provided for transmitting user data or control messages to other entities via a transmitter 111 and to receive user data and control messages from other entities using receiver 112. The interface is especially qualified to receive and transmit the video stream. The entity furthermore comprises a processing unit 120 which is responsible for the operation of the entity 100. The processing unit 120 comprises one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above described functionalities in which the entity is involved.

Figure 5:
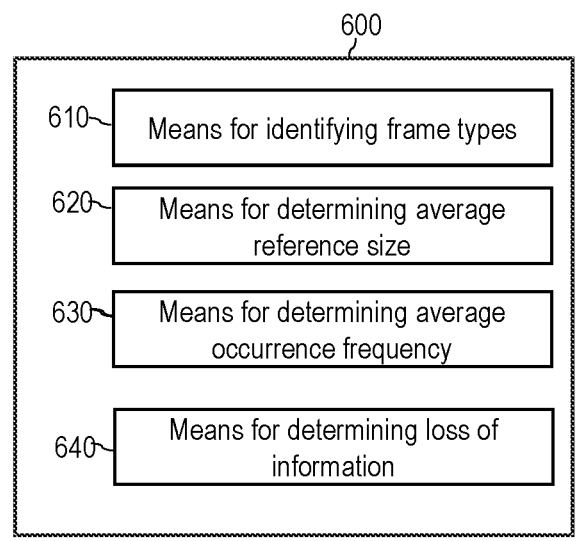
FIG. 5 shows a further schematic view of an entity configured to determine the mean opinion score of a multimedia service.

FIG. 5 shows a further view of the entity carrying out the determination of the packet loss. The entity 600 comprises means 610 for identifying frame types, e.g. in the first learning period and/or in the second time period. Furthermore, means 620 is provided for determining the average reference size in the learning period. Means 630 is provided for determining the average occurrence frequency and means 640 is provided for determining the loss of information as discussed above.

From the above said, some general conclusions can be drawn:

In the learning period the following information provided in the header of the packets can be used to identify the different frame types: the sequence number of the data packets, a marker indicating when a new video frame starts, and the time indicator associated with the video frame. However, in the other time periods, the identification of the different frame types may be limited to the following information provided in the header: the marker indicating that the new video frame starts and the time indicator associated with the video frame.

The reference average size and the reference occurrence frequency may only be used to determine the loss of information when the amount of packets lost in the learning period is below a threshold.

As mentioned above the amount of data packets lost in the learning period may be determined based on the sequence number of the data packets. The loss of information in the other time periods after the learning time period may be determined by comparing the reference average size of one frame type to the size of the frames of said one frame type determined in the second time period.

It is possible to determine a time period in the video stream between two I-frames when the reference occurrence frequency is determined. In the same way the number of B frames between two I-frames may be determined.

For determining the different frame types the following steps may be carried out:

it may be determined when one frame ends and another frame starts in the learning time period. Furthermore, a size distribution of the frames identified in the first learning period is determined and the frame type for the frames identified in the first learning period is determined based on the determined size distribution. As discussed above in connection with FIG. 1 it is possible to differentiate the different frame types based on the size.

Furthermore, it may be determined how old a data packet in the video stream is based on the time indicator present in the data packets. When data packets are older than a defined time these data packets are considered as non-existing when determining the loss of information. As the main field of application is mainly real-time applications, data packets that are older than a predefined time may be ignored.

For determining the loss of information, the loss of data packets in the second time period is preferably determined for each frame in the second time period. When the loss of information is determined, it is possible to determine a packet loss within an I frame and the packet loss in a subsequent depending P frames. Furthermore, the packet loss within a P frame and the packet loss in subsequent depending P frames may be determined.

Additionally, the mean opinion score MLS loss of packets, for the video stream may be determined based on the determined loss of information.

Determining the loss of information can furthermore comprise the steps of determining a loss of at least one data packet belonging to an I frame, wherein the loss of information is determined taking into account an influence of the loss of at least one data packet belonging to an I frame on packets of another frame type.

Additionally, determining the loss of information can comprise the step of determining a loss of at least one data packet belonging to a P frame, wherein the loss of information is determined taking into account an influence of the loss of at least one data packet belonging to a P frame on packets of another depending P frame.

The loss of information in a depending P frame can be proportional to the byte loss ratio of the previous I and P frames.

Determining the loss of information in the second time period can include the following steps:
  determining a loss of at least one packet in the second time period based on the reference average size and reference occurrence frequency and based on the markers in the second time period indicating when a new video frame starts,
  determining to which frame type the at least one packet belongs, based on the reference average size of at least some of the frame types and based on the size of the identified frame type
  determining a ratio of packets lost for the determined frame type.

The loss of information in the video stream can be determined taking into account a frame structure and dependencies among the frames in the video stream.

Furthermore, determining the loss of information can include the step of determining the number of bytes lost in the different frame types in the second time period.

Additionally, for determining the loss of information it can be determined whether the loss of bytes occurred in an I or P frame, wherein an effect of the loss in an I or P frame on frames depending on the frames, where the loss occurred, is determined. Here, as can be deduced from the formula for determining $L_{eff}$, the loss depends on the fact how far from a subsequent I frame the loss in the I or P frame occurred.

Summarizing using effective packet loss in video MOS estimation formulas for ViLTE are provided, in order to take into account the impairments beyond packet loss and their effect on the subsequent dependent frames. The effective packet loss takes into account the frame structure of the video session and the propagation of error across multiple frames, effect of packet loss in I, P or B frames.

The loss of information can also be determined for a video stream comprising only I and P frames and no B frames. In this context it is possible to determine a size of a first P frame between two consecutive I frames which comprises a loss, wherein the loss of information in the video stream is determined taking into account the determined size of the first P frame.

Here it is possible to determine a number Np of P frames after the first P frame between two consecutive I frames which comprises a loss and the next I frame, wherein the loss of information is determined taking into account the determined number Np of P frames.

The process of mapping the frame structure, including the following steps: identification of the frame types, frame frequencies, obtaining the packet loss for the different frame types, calculating the effective packet loss for the different frame types, and calculating the MOS degradation due to the effective packet loss for each time periods.

The method of mapping the video frame structure and characteristics based on RTP header parameters and payload size can, include:
 Identifying the frame types in the video stream
 Identifying the time periods of the frame size
 Identifying the payload size of the frames
 A specific formula, where the lost packet is not distinguished within a frame, and the effect of the packet lost on the subsequent frames depends only on the fraction of the lost bytes.
 A more general formula where the effective packet loss depends on the position of the lost packet within the frame and the effect on the different packets of the depending frames.

The invention provides the following advantages. Only RTP header information and RTP payload size are used that can be obtained by RTP traffic probes requiring a single taping point in the user plane. No side information is needed.

The effective packet loss determined by this method can be used in other MOS estimation formulas including packet loss. Complex MOS formulas are considerably simplified when impairment reduces to packet loss only.

By the effective packet loss the following factors are taken into account:
 packet loss
 packet delay and jitter
 the different effect of packet loss in I, P or B frames
 the fraction of the bytes lost within the frame
 propagation of the error across the video frames.

The invention claimed is:

1. A method for estimating a loss of information in a video stream comprising video frames of different frame types, wherein the video stream is transmitted in a sequence of data packets, the method comprising:
 during a first learning period of the video stream:
  identifying the different frame types in the video stream; and
  determining a reference average size of at least some of the frame types in the video stream; and
  determining a reference occurrence frequency representing how often at least some of the frame types occur in the video stream;
  wherein the reference average size and the reference occurrence frequency are determined using information provided in a header of the transmitted data packets; and
  wherein in the first learning period the following information, provided in the header, is used to identify the different frame types: a sequence number of the data packets, a marker indicating when a new video frame starts, and a time indicator associated with the video frame; and
 during a second time period of the stream:
  identifying the different frame types in the video stream taking into account the reference average frame size, the reference occurrence frequency determined in the first learning period, and information provided in the header of the data packets in the second time period, wherein in the second time period the identification of the different frame types is limited to the following information provided in the header: a marker indicating when a new video frame starts, and a time indicator associated with the video frame;
  determining the size of at least some of the frames in the second time period; and
  determining the loss of information in the video stream taking into account the reference average size, the reference occurrence frequency determined in the first learning period, and the determined size of at least some of the frames in the second time period;
  wherein the reference average size and the reference occurrence period are only used to determine the loss of information when an amount of data packets lost in the first learning period is below a threshold.

2. The method according to claim 1, wherein the amount of data packets lost in the first learning period is determined based on a sequence number of the data packets.

3. The method according to claim 1, wherein determining the loss of information comprises comparing the reference average size of one frame type to the size of the frames of said one frame type determined in the second time period.

4. The method according to claim 1, wherein determining the reference occurrence frequency comprises determining a time period in the video stream between two I frames.

5. The method according to claim 1, wherein determining the reference occurrence frequency comprises determining a number of P frames between two I frames.

6. The method according to claim 1, wherein identifying the different frame types comprises:
 determining when one frame ends and another frame starts in the first learning period;
 determining a size distribution of the frames identified in the first learning period; and
 determining a frame type for the frames identified in the first learning period based on the determined size distribution.

7. The method according to claim 1:
wherein it is determined how old a data packet in the video stream is based on a time indicator present in the data packets of each video frame; and
wherein data packets that are older than a defined time are considered as non-existing when determining the loss of information.

8. The method according to claim 1, wherein determining the loss of information comprises determining, preferably for each frame, a loss of data packets in the second time period.

9. The method according to claim 1, wherein determining the loss of information comprises determining a packet loss within an I-frame and the packet loss in any subsequent depending P-frames.

10. The method according to claim 1, wherein determining the loss of information comprises determining a packet loss within a P-frame and the packet loss in any subsequent depending P-frames.

11. The method according to claim 1, further comprising determining a Mean Opinion Score (MOS) for the video stream based on the determined loss of information.

12. The method according to claim 1:
wherein determining the loss of information comprises determining a loss of at least one data packet belonging to an I frame; and
wherein the loss of information is determined taking into account an influence of the loss of at least one data packet belonging to an I frame on packets of another frame type.

13. The method according to claim 1:
wherein determining the loss of information comprises determining a loss of at least one data packet belonging to a P frame; and
wherein the loss of information is determined taking into account an influence of the loss of at least one data packet belonging to a P frame on packets of another depending P frame.

14. The method according to claim 13 wherein the loss of information in a depending P frame is proportional to the byte loss ratio of the previous I and P frames.

15. The method according to claim 1, wherein determining the loss of information in the video stream comprises:
determining a loss of at least one packet in the second time period based on the reference average size and reference occurrence frequency and based on the markers in the second time period indicating when a new video frame starts;
determining to which frame type the at least one packet belongs based on the reference average size of at least some of the frame types and based on the size of the identified frame type; and
determining a ratio of packets lost for the determined frame type.

16. The method according to claim 1, wherein the loss of information in the video stream is determined taking into account a frame structure and dependencies among the frames in the video stream.

17. The method according to claim 1, wherein determining the loss of information comprises determining the number of bytes lost in the different frame types in the second time period.

18. The method according to claim 1:
wherein determining the loss of information comprises determining the loss of bytes occurring in an I or P frame; and
wherein an effect of the loss in an I or P frame on frames depending on the frames where the bytes were lost is determined taking into account how far the loss of bytes is occurring from a subsequent I frame in the video stream.

19. The method according to claim 1, wherein the loss of information is determined for a video stream comprising only I and P frames.

20. The method according to claim 19, further comprising determining a size of a first P frame between two consecutive I frames which comprises a loss, wherein the loss of information in the video stream is determined taking into account the determined size of the first P frame.

21. The method according to claim 20, further comprising determining a number Np of P frames after the first P frame between two consecutive I frames which comprises a loss and the next I frame, wherein the loss of information is determined taking into account the determined number Np of P frames.

22. An apparatus of a network through which a video stream of different frame types is transmitted, wherein the video stream is transmitted in a sequence of data packets, the apparatus comprising a memory and at least one processor, the memory containing instructions executable by said at least one processor, the apparatus operative to:
during a first learning period of the video stream:
identify the different frame types in the video stream;
determine a reference average size of at least some of the frame types in the video stream; and
determine a reference occurrence frequency representing how often at least some of the frame types occur in the video stream;
wherein the reference average size and the reference occurrence frequency are determined using information provided in a header of the transmitted data packets; and
wherein in the first learning period the following information, provided in the header, is used to identify the different frame types: a sequence number of the data packets, a marker indicating when a new video frame starts, and a time indicator associated with the video frame; and
during a second time period of the stream:
identify the different frame types in the video stream taking into account the reference average frame size, the reference occurrence frequency determined in the first learning period, and information provided in the header of the data packets in the second time period, wherein in the second time period the identification of the different frame types is limited to the following information provided in the header: a marker indicating when a new video frame starts, and a time indicator associated with the video frame; and
determine the size of at least some of the frames in the second time period;
wherein the apparatus is configured to determine the loss of information in the video stream taking into account the reference average size and reference occurrence frequency determined in the first learning period, and the determined size of at least some of the frames in the second time period;
wherein the apparatus is configured to only use the reference average size and the reference occurrence period to determine the loss of information when an amount of data packets lost in the first learning period is below a threshold.

23. The apparatus according to claim 22, wherein the apparatus is operative to determine the amount of data packets lost in the first learning period based on a sequence number of the data packets.

24. The apparatus according to claim 22, wherein the apparatus is operative to compare the reference average size of one frame type to the size of the frames of said one frame type determined in the second time period for determining the loss of information.

25. The apparatus according to claim 22, wherein the apparatus is operative to determine a time period in the video stream between two I frames for determining the reference occurrence frequency.

26. The apparatus according to claim 22, wherein the apparatus is operative to determine a number of P frames between two I frames for determining the reference occurrence frequency.

27. The apparatus according to claim 22, wherein the apparatus is operative to:
  determine when one frame ends and another frame starts in the first learning period;
  determine a size distribution of the frames identified in the first learning period; and
  determine a frame type for the frames identified in the first learning period based on the determined size distribution.

28. The apparatus according to claim 22:
  wherein the apparatus is operative to determine how old a data packet in the video stream is based on a time indicator present in the data packets of each video frame; and
  wherein data packets that are older than a defined time are considered as non-existing when determining the loss of information.

29. The apparatus according to claim 22, wherein the apparatus is operative to determine, preferably for each frame, a loss of data packets in the second time period.

30. The apparatus according to claim 22, wherein the apparatus is operative to determine a packet loss within an I-frame and the packet loss in the subsequent depending P-frames.

31. The apparatus according to claim 22, wherein the apparatus is operative to determine a packet loss within a P-frame and the packet loss in the subsequent depending P-frames.

32. The apparatus according to claim 22 wherein the apparatus is operative to determine a Mean Opinion Score (MOS) for the video stream based on the determined loss of information.

33. The apparatus according to claim 22:
  wherein the apparatus is operative to determine a loss of at least one data packet belonging to an I frame; and
  wherein the loss of information is determined taking into account an influence of the loss of at least one data packet belonging to an I frame on packets of another frame type.

34. The apparatus according to claim 22:
  wherein the apparatus is operative to determine a loss of at least one data packet belonging to a P frame; and
  wherein the loss of information is determined taking into account an influence of the loss of at least one data packet belonging to a P frame on packets of another depending P frame.

35. The apparatus according to claim 22, wherein the apparatus is operative to:
  determine a loss of at least one packet in the second time period based on the reference average size and reference occurrence frequency and based on the markers in the second time period indicating when a new video frame starts;
  determine to which frame type the at least one packet belongs, based on the reference average size of at least some of the frame types and based on the size of the identified frame type; and
  determine a ratio of packets lost for the determined frame type.

36. The apparatus according to claim 22, wherein the apparatus is operative to determine the loss of information in the video stream taking into account a frame structure and dependencies among the frames in the video stream.

37. The apparatus according to claim 22, wherein the apparatus is operative to determine the loss of information for a video stream comprising only I and P frames.

38. The apparatus according to claim 22, wherein the apparatus is operative to:
  determine a size of a first P frame between two consecutive I frames which comprises a loss; and
  determine the loss of information in the video stream taking into account the determined size of the first P frame.

39. The apparatus according to claim 38, wherein the apparatus is operative to:
  determine a number Np of P frames after the first P frame between two consecutive I frames which comprises a loss and the next I frame; and
  determine the loss of information taking into account the determined number Np of P frames.

40. A non-transitory computer readable medium storing a computer program product for controlling an apparatus of a network through which a video stream of different frame types is transmitted, the computer program product comprising software instructions which, when run on at least one processing unit of the apparatus, causes the apparatus to:
  during a first learning period of the video stream:
    identify the different frame types in the video stream;
    determine a reference average size of at least some of the frame types in the video stream; and
    determine a reference occurrence frequency representing how often at least some of the frame types occur in the video stream;
    wherein the reference average size and the reference occurrence frequency are determined using information provided in a header of the transmitted data packets; and
    wherein in the first learning period the following information, provided in the header, is used to identify the different frame types: a sequence number of the data packets, a marker indicating when a new video frame starts, and a time indicator associated with the video frame; and
  during a second time period of the stream:
    identify the different frame types in the video stream taking into account the reference average frame size, the reference occurrence frequency determined in the first learning period, and information provided in the header of the data packets in the second time period, wherein in the second time period the identification of the different frame types is limited to the following information provided in the header: a marker indicating when a new video frame starts, and a time indicator associated with the video frame;
    determine the size of at least some of the frames in the second time period; and determine the loss of information in the video stream taking into account the reference average size, the reference occurrence frequency determined in the first learning period, and the determined size of at least some of the frames in the second time period;

wherein the reference average size and the reference occurrence period are only used to determine the loss of information when an amount of data packets lost in the first learning period is below a threshold.

* * * * *